Figure 9:
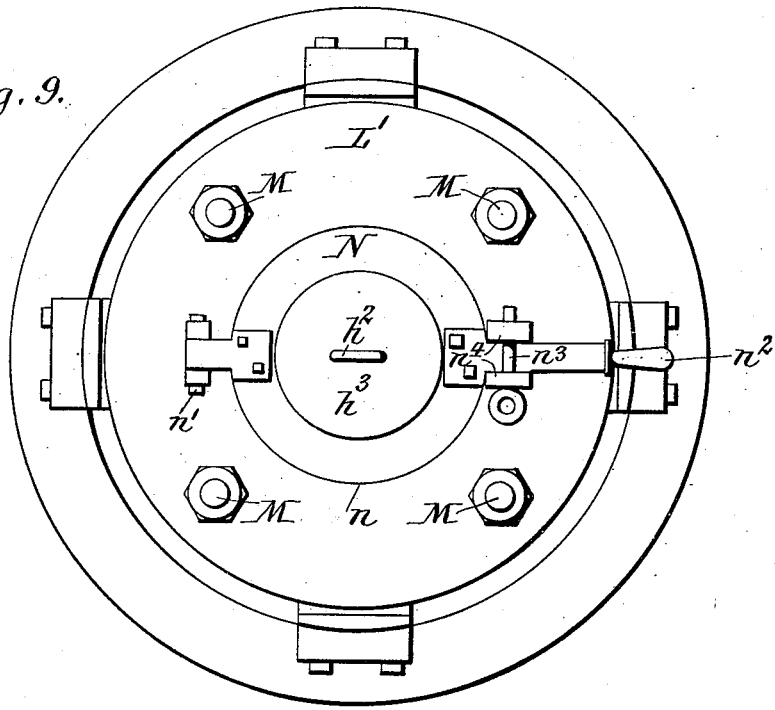

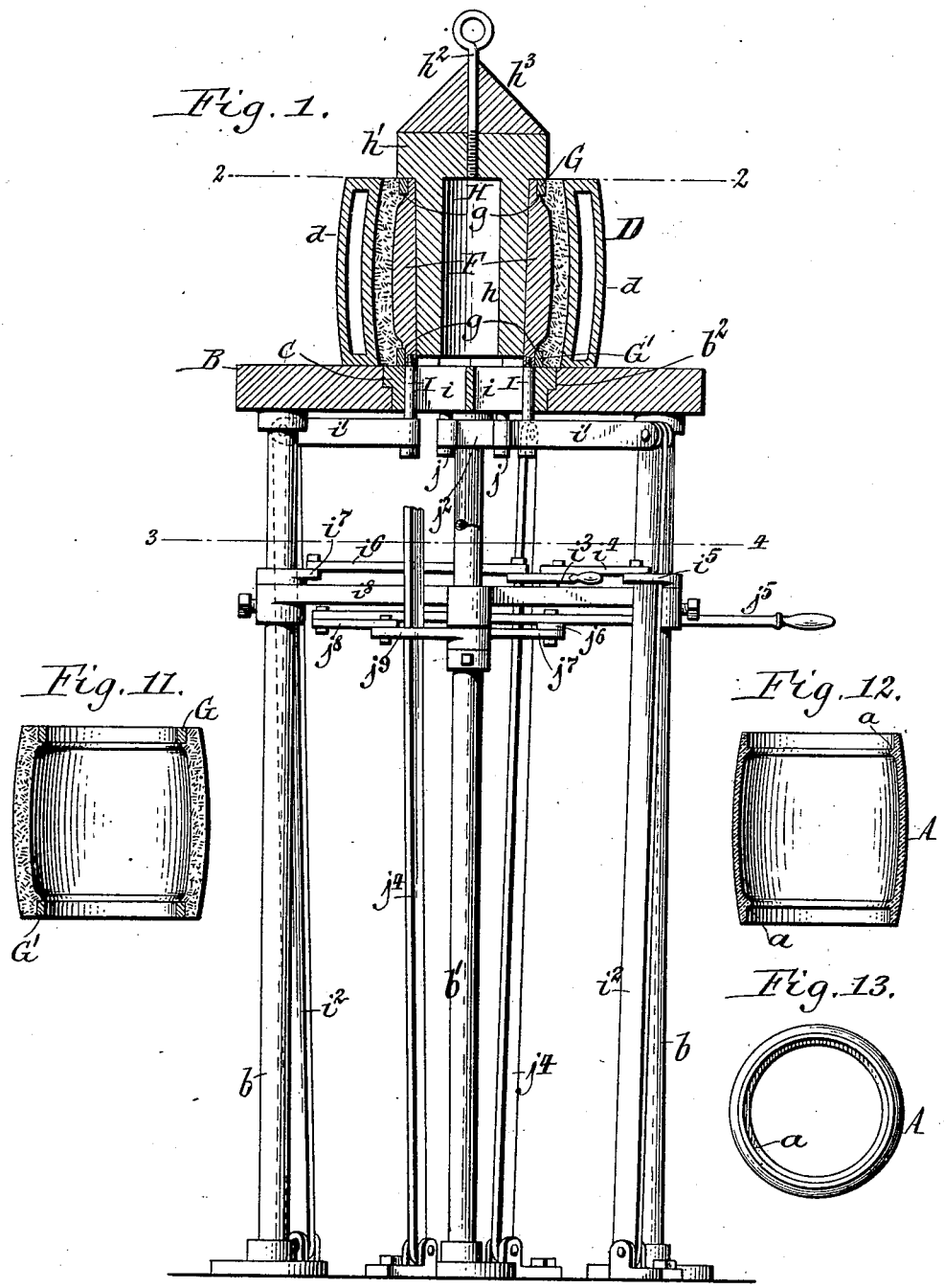

No. 666,812. Patented Jan. 29, 1901.
G. W. LARAWAY.
MACHINE FOR MOLDING BARRELS, &c.
(Application filed May 31, 1900.)
(No Model.) 4 Sheets—Sheet 2.
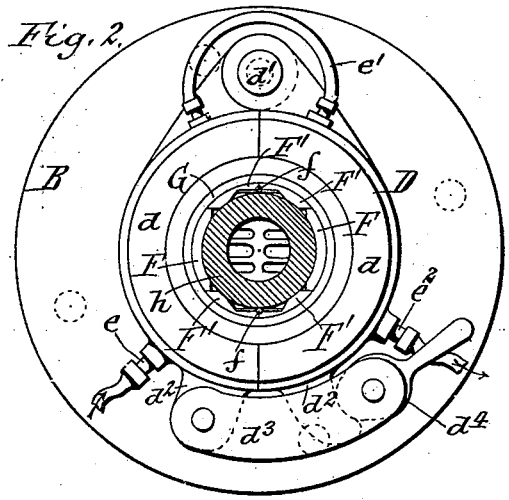
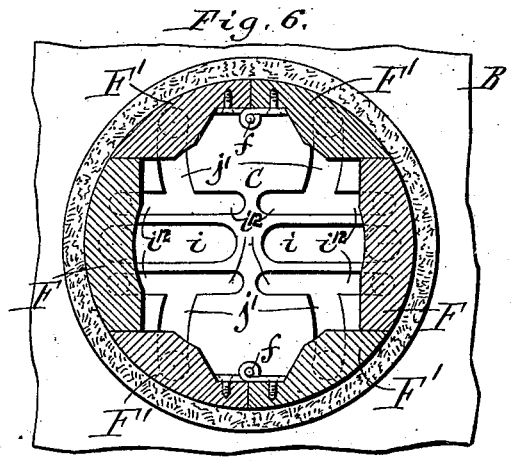
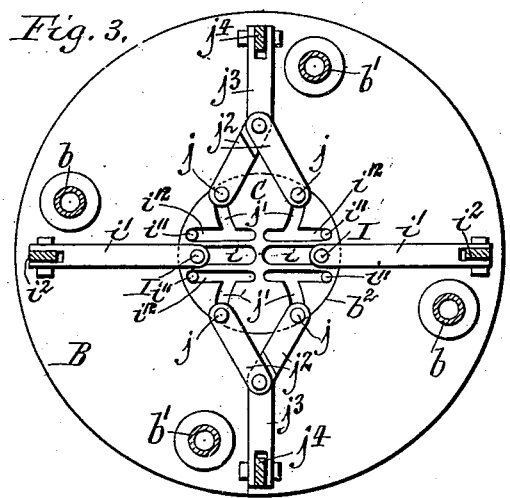
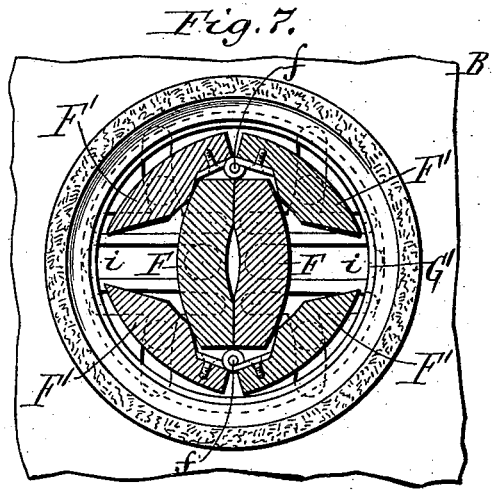
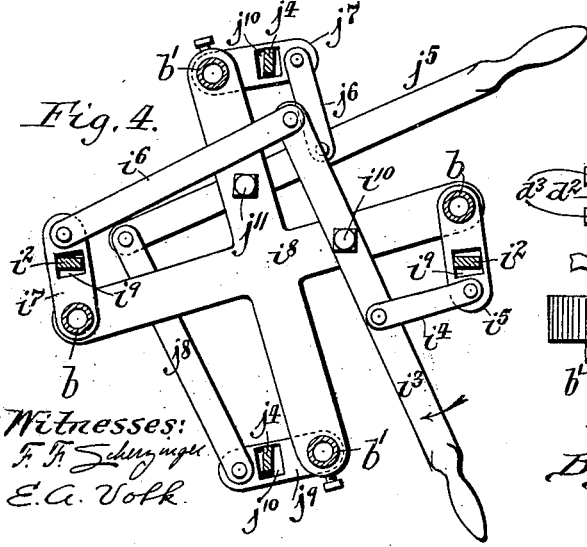
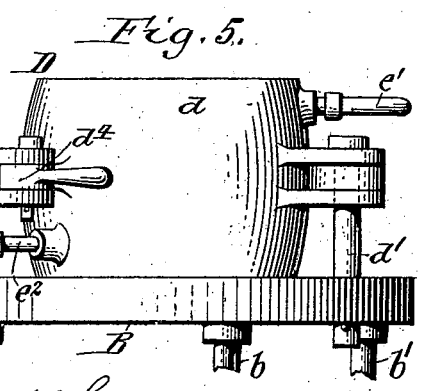
Witnesses:
F. F. Schurzinger
E. A. Volk
Geo. W. Laraway Inventor
By Wilhelm Bonner
Attorneys.
THE NORRIS PETERS CO., PHOTO-LITHO., WASHINGTON, D. C.

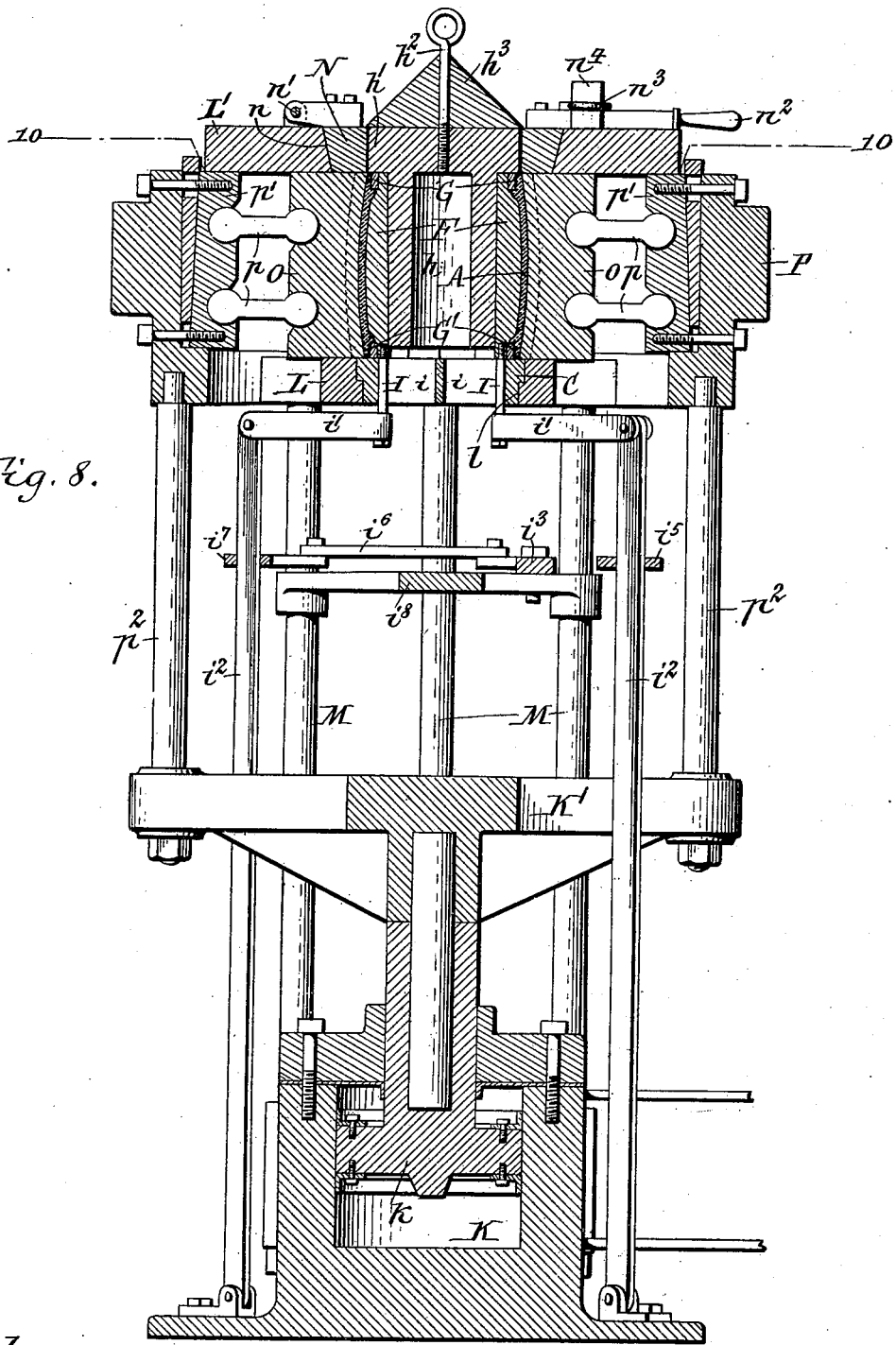

No. 666,812. Patented Jan. 29, 1901.
G. W. LARAWAY.
MACHINE FOR MOLDING BARRELS, &c.
(Application filed May 31, 1900.)
(No Model.) 4 Sheets—Sheet 4.

UNITED STATES PATENT OFFICE.

GEORGE W. LARAWAY, OF NEW YORK, N. Y., ASSIGNOR TO THE NATIONAL PACKAGE COMPANY, OF GLENS FALLS, NEW YORK.

MACHINE FOR MOLDING BARRELS, &c.

SPECIFICATION forming part of Letters Patent No. 666,812, dated January 29, 1901.

Application filed May 31, 1900. Serial No. 18,629. (No model.)

*To all whom it may concern:*

Be it known that I, GEORGE W. LARAWAY, a citizen of the United States, and a resident of New York, borough of Manhattan, in the county and State of New York, have invented a new and useful Improvement in Machines for Making Barrels and Kegs from Fibrous Composition, of which the following is a specification.

This invention relates to that class of machines for molding and pressing the bodies of barrels and kegs in which a collapsible former is employed on which the body of the barrel or keg is molded or pressed, and which consists of six sections which are movable toward and from the axis of the former. Two of the sections of the former in question are capable of a sliding movement only and move in rectilinear lines in diametrically opposite directions. On each side of the path of these two sliding sections two folding sections are arranged, which are hinged together and which are also capable of a limited bodily movement toward and from the axis of the former. In the expanded position of the former the sliding sections stand between the free ends of the folding sections. For collapsing the former the sliding sections are withdrawn first, so as to release the folding sections, which latter are then moved and folded inwardly.

One part of my invention has for its object to produce a simple and convenient mechanism for moving these sections of this style of collapsible former.

Another part of my invention has for its object to produce simple and convenient means for closing the top of the annular space in which the body of the barrel or keg is pressed.

The apparatus to which my invention is applied is designed more especially for forming hollow ware from a fibrous composition of matter containing a cementing ingredient which is fusible by heat—for instance, rosin. In the preferred method of manufacturing such hollow ware the body of the barrel or keg is first molded in the rough in a preliminary molding apparatus by supplying sufficient heat to fuse the cementing ingredient of the composition. The molded body, which is rather loose in texture, is then removed from the molding apparatus and placed in the pressing apparatus, where it is further molded and compacted and finished by the application of heat and pressure. The same style of collapsible former is used in the preliminary molding apparatus and in the pressing apparatus and the description of one of these formers applies to the other.

Figure 10:
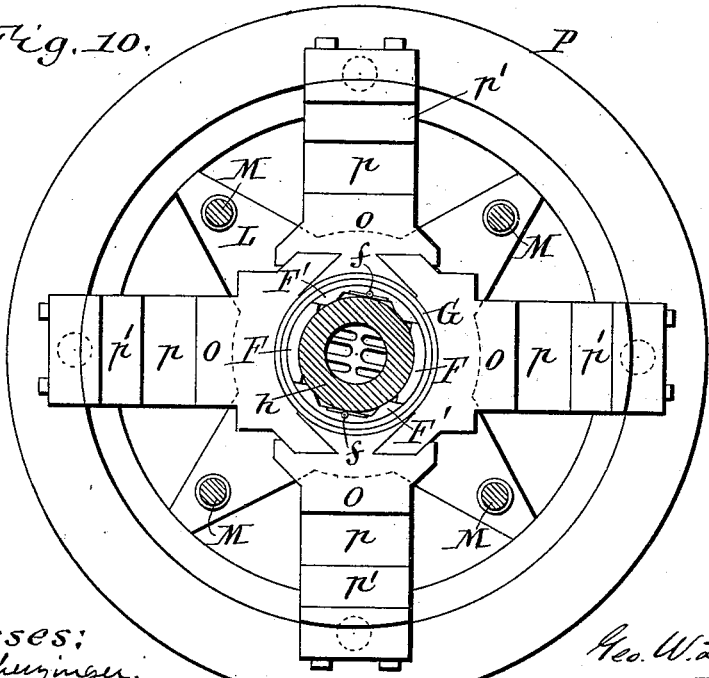

In the accompanying drawings, consisting of four sheets, Figure 1 is a sectional elevation of the preliminary molding apparatus. Fig. 2 is a horizontal section in line 2 2, Fig. 1, looking downwardly. Fig. 3 is a horizontal section in line 3 4, Fig. 1, looking upwardly and showing part of the mechanism whereby the collapsible former-sections are operated. Fig. 4 is a horizontal section in line 3 4, Fig. 1, looking downwardly and showing another part of the mechanism whereby the collapsible former-sections are operated. Fig. 5 is a fragmentary side elevation of the preliminary molding apparatus. Fig. 6 is a horizontal section, on an enlarged scale, taken centrally through the former and showing the position of the latter and the molded barrel upon the same preparatory to collapsing the former. Fig. 7 is a similar view showing the former collapsed. Fig. 8 is a vertical section of the pressing apparatus. Fig. 9 is a top plan view of the same. Fig. 10 is a horizontal section in line 10 10, Fig. 8. Fig. 11 is a vertical section of the molded barrel-body before the same is pressed. Fig. 12 is a sectional elevation of the finished barrel-body. Fig. 13 is a top plan view of the same.

Like letters of reference refer to like parts in the several figures.

The barrel or keg which is produced by my improved apparatus and which is shown in Figs. 8, 10, 12, and 13 consists of a body A, which has a bilge or is larger at the middle than at its ends, and is provided at each end with an internal rabbet or chime $a$, in which the head is secured. The preliminary molding apparatus is shown in Figs. 1 to 5 and is constructed as follows:

B represents a horizontal molding-table which is supported by legs $b\ b'$ and provided with a central opening $b^2$.

C represents a horizontal guide-plate which is arranged in a central opening of the molding-table with its top flush with the top of the table.

D represents the outer portion of the mold in which the body of the barrel or keg is formed and which has its inner side shaped to correspond with the form which it is desired to give the body. The outer portion of the mold is composed of two diametrically-joined sections $d\ d$, which are pivotally connected to each other and to the forming-table at the rear joint between the sections by a pintle $d'$, extending vertically through overlying ears on the rear sides of the sections and passing through an opening in the forming-table, as represented in Figs. 2 and 5. The opposite or front ends of the sections of the mold are detachably connected by a suitable clamping device, that shown consisting of two lugs $d^2\ d^2$, arranged on the front ends of the sections, a pair of links $d^3$, pivoted to one of these lugs, and a cam-lever $d^4$, pivoted to the links and adapted to engage with the lug of the other section, as represented in Figs. 2 and 5. The outer mold-sections are chambered to permit a heating or cooling agent, such as steam or cold water, to be introduced into these chambers. The heating or cooling medium is supplied to one end of one section by an inlet-pipe $e$ and conducted from the opposite end of this section to one end of the other section by an intermediate pipe $e'$ and is drawn off from the opposite end of the other section by an outlet-pipe $e^2$. Each of these pipes is provided with a flexible portion which permits the sections of the mold to be opened and closed without disturbing the connections with the chambers.

F F' represent the sections of the collapsible former, whereby the inner side of the barrel or keg is formed and which rest upon the guide-plate C. F represents the sliding sections, and F' the two pairs of folding sections. The members of each pair of folding sections are pivoted to each other at their adjacent ends by vertical hinges $f$ and are capable of moving bodily in and out and also of folding inwardly and outwardly on their hinges. In the expanded position of the former-sections the sliding sections F stand between the free ends of the folding sections, as shown in Fig. 6.

G G' represent an upper and a lower ring which constitute part of the former and which mold the chimes or rabbets $a$ at the ends of the barrel-body. Each of the former-sections is reduced at its ends, forming near each end a shoulder $g$. The adjacent shoulders of the several sections form together, when the sections are expanded, two annular seats, which receive the former-rings G G'. When these rings rest on these seats, the rings are flush with the ends of the former-sections and project laterally beyond the circumferential faces of the former-sections, whereby these rings produce the chimes or rabbets $a$ on the ends of the barrel-body. In order to apply these rings to the former-sections, the latter are contracted and the lower former-ring G' is slipped downwardly over the sections and placed upon the guide-plate C. The former-sections are then expanded and the upper former-ring G is placed upon the upper annular shoulders $g$. The outer sections of the mold are then closed around the expanded former, thereby forming an annular space between the former-sections and the outer portion of the mold.

H represents a supporting and heating core which is placed within the collapsible former and whereby the former-sections are supported against inward pressure and also heated when necessary. This supporting and heating core has a cylindrical lower or body portion $h$, which fits into the central space within by the expanded former-sections and which is provided at its upper end with an outwardly-projecting annular flange $h'$, which extends over the upper edges of the former-sections and the upper former-ring. The core is provided with a screw-eye $h^2$ for manipulating the core and with a conical top $h^3$.

The mechanism for expanding and contracting the former-sections is shown in Figs. 1, 3, and 4 and is constructed as follows: I I represent actuating-pins, which are secured centrally to the under side of the sliding former-sections F F and which project downwardly through radial slots $i\ i$, formed in the guide-plates C on diametrically opposite sides thereof. The lower end of each of these pins is loosely connected with the inner end of a horizontal link $i'$, and the outer end of this link is pivoted to the upper end of an upright rock-lever $i^2$, which latter is pivoted at its lower end to the floor or some other stationary support. Upon moving this lever inwardly or outwardly the sliding core-section connected therewith is moved inwardly or outwardly on the guide-plate. The two sliding sections F are caused to move inwardly and outwardly simultaneously by a horizontally-swinging rock-lever $i^3$, having one of its arms connected by a link $i^4$ with a rock-arm $i^5$, which connects with one of the upright rock-levers $i^2$, while its other arm is connected by a link $i^6$ with an arm $i^7$, which connects with the other upright rock-lever $i^2$. The horizontally-swinging lever $i^3$ is pivoted to a support or bridge-tree $i^8$, which is secured to the legs of the molding-table. The rock-arms $i^5\ i^7$ are pivoted to diametrically opposite legs $b\ b$ of this table and project in opposite directions, as shown in Figs. 1 and 4. The connection between the rock-arms $i^5\ i^7$ and the upright rock-arm $i^2$ is preferably made by passing the rock-levers loosely through openings $i^9$ in the rock-arms, as represented in Fig. 4. Upon turning the rock-lever $i^3$ in the direction of the arrow, Fig. 4, the rock-arms $i^5\ i^7$ move the upright rock-levers $i^2$ inwardly, together with the sliding core-sections F, connected therewith, while upon moving the rock-lever $i^3$ in the opposite direction the upright rock-levers $i^2$ and the sliding core-sections F are moved outwardly. The pivot of the horizontal rock-lever $i^3$ is shown at $i^{10}$.

In order to prevent the sliding core-sections F F from turning or becoming displaced as they move toward and from each other, each of these sections is provided on its under side with two depending guide-pins $i^{11}$, which are arranged on opposite sides of the central actuating-pin I and which project into guide-slots $i^{12}$, formed in the guide-plate C on opposite sides of the central guide-slot $i$ and parallel therewith, as represented in Figs. 2, 3, and 6.

The members of each pair of folding sections F' F' are each provided with a depending pin $j$, which projects downwardly through a curved slot $j'$ in the guide-plate C, Figs. 1, 3, and 6. These two curved slots $j'$ converge from their outer ends inwardly toward the side guide-slots $i^{12}$ of the sliding sections F and preferably run into these side slots, although this is not essential, but simply a convenience in construction. The lower ends of the pins $j$ of each pair of folding sections are connected by two branch links $j^2 j^2$ to the inner end of a main horizontal link $j^3$. The outer end of the latter is pivoted to the upper end of an upright rock-lever $j^4$, which latter is pivoted at its lower end to the floor or some other support. Upon moving the upright lever $j^4$ inwardly the folding sections connected therewith are also carried inwardly, and at the same time these folding core-sections are caused to fold toward each other by the action of the inwardly-converging slots $j'$, in which their depending guide-pins $j$ move. Upon moving the upright lever $j^4$ outwardly the folding sections connected therewith are moved outwardly and at the same time spread or unfolded into their operative position by the action of the outwardly-diverging slots $j'$, in which their guide-pins $j$ move. The upright levers $j^4$, which actuate the two pairs of folding sections, are moved inwardly and outwardly simultaneously by a hand-lever $j^5$, which is pivoted on the bridge-tree $i^8$ and connected with one of its arms by a link $j^6$ to a rock-arm $j^7$, which is connected with one of the upright levers $j^4$, while its other arm is connected by a link $j^8$ with a rock-arm $j^9$, which is connected with the other upright rock-lever $j^4$. The rock-arms $j^7 j^9$ are pivoted to diametrically opposite legs $b' b'$, which support the molding-table and project in opposite directions, and each of these arms is connected with its respective upright lever by passing the latter through an opening $j^{10}$ in the rock-arm, as shown in Fig. 4. The pivot of the horizontal rock-lever $j^5$ is shown at $j^{11}$.

The operation of molding the body of a barrel or keg in the preliminary molding apparatus is conducted as follows: The former having been expanded and provided with the chime-forming rings, the core is heated and inserted into the former, and the outer mold-sections are heated by steam admitted into the chambers of the same, whereby the inner and outer portions of the mold are thoroughly heated. The space between the former and the outer portion of the mold is now filled to the top with the fibrous composition, which is conveniently introduced into this space by means of a funnel. The conical top of the core sheds any particles of composition which may fall upon the same and prevents the same from lodging on this core. The heat of the mold fuses the resinous ingredient of the composition and causes the ingredients of the composition to become united. The steam is now shut off from the outer mold-sections and cold water is admitted to the same, thereby cooling these sections and chilling the outer or surface portions of the molded barrel or keg body, thereby causing this body to detach itself from the outer portion of the mold. The mold is now opened, the heating-core is removed from the former, and the latter is collapsed. For that purpose the sliding sections F F are first moved inwardly by operating the hand-lever $i^3$ until these sections bear against each other, and then the two pairs of folding sections F' F' are moved and folded inwardly against the opposite ends of the sliding sections by operating the hand-lever $j^5$. Upon contracting the former-sections the latter detach themselves from the inner side of the molded body and from the chime-forming rings, and these rings remain attached to the ends of the molded barrel-body. In the contracted position of the former-sections the greatest diameter of the former is less than the smallest diameter of the barrel-body and the chime-forming rings attached thereto. This permits the molded barrel-body, together with the rings, to be removed from the former, as shown in Fig. 11, and placed in the press for compressing the barrel-body.

The press whereby the body of the barrel or keg is pressed after it has been so molded is shown in Figs. 8, 9, and 10, and is constructed as follows: K represents an upright hydraulic cylinder provided with a vertically-movable piston or plunger $k$, and K' is a presser-head or spider secured to the upper end of the plunger. L represents a lower horizontal supporting-plate arranged above the presser-head, and L' an upper horizontal supporting-plate secured in position above the lower plate and separated therefrom by an intervening space. The upper and lower plates are rigidly connected with the hydraulic cylinder in a well-known manner by upright posts or columns M. A collapsible former is mounted centrally upon the lower plate L, which former is constructed and operated like that of the preliminary molding apparatus. The above description of the collapsible former and of its operating mechanism therefore applies to the like parts embodied in the pressing apparatus. In the press the guide-plate C, upon which the former rests, is supported in a central opening $l$ in the lower plate of the press, and the rock-arms $i^5 i^7 j^7 j^9$, which operate the upright lock-levers $i^2 j^4$, are mounted upon the columns M of the press. The upper plate L' of the press is provided with a central opening $n$, through which the molded barrel-body, with the chime-forming rings attached thereto, is placed upon the contracted former of the press. When the molded body, with the rings attached thereto, has been placed upon the guide-plate C of the press, the sections of the former are expanded and fit against the inner side of the molded barrel-body and the rings attached thereto in the same manner in which the former of the preliminary molding apparatus fits against the inner side of the molded barrel or keg and its rings at the completion of the molding operation. N represents a movable retaining-ring which is placed in the opening $n$ in the top plate, and whereby this opening is reduced in diameter. This ring when in place is flush on its under side with the under side of the upper plate L' and extends inwardly over the upper edge of the molded barrel or keg body before the same is compressed, the outer side of the unpressed body being indicated by dotted lines, Fig. 8. This retaining-ring is preferably pivoted on one side at $n'$ to the upper plate L', as shown, while its other side is provided with a handle $n^2$, which is detachably connected to the plate L' by a pin $n^3$, passing through lugs $n^4$ on the plate and over the handle, as represented in Figs. 8 and 9. After the movable sections of the former have been expanded into engagement with the inner side of the molded barrel-body and its rings the retaining-ring N is swung down and into the opening of the upper plate and fastened, as described. O represents the radially-movable presser-staves, whereby the molded barrel-body is compressed, and which are arranged in the space between the upper and lower plates L L' in a well-known manner. Four of these staves constitute the set shown in the drawings; but a greater number may be employed, if desired. These staves are moved toward and from the former by any suitable mechanism, preferably by means of a vertically-moving toggle-ring P, which surrounds the presser-staves, and vertically-swinging toggle-bars $p$, connecting the presser-staves with chairs $p'$, secured to the toggle-ring, as represented in Figs. 8 and 10. The toggle-ring is connected by posts $p^2$ with the presser-head of the plunger, so as as to rise and fall with the latter. The operation of forming and pressing the body of a barrel or keg in this pressing apparatus is conducted as follows: The molded barrel or keg body, with the chime-forming rings attached thereto, is placed over the contracted former in the press while the presser-staves are expanded. The former is then expanded into engagement with the inner side of the barrel or keg body and its forming-rings, and the retaining-ring N is swung down into the opening in the upper plate of the press. The previously-heated core H is then inserted into the former. The presser-staves are then moved inwardly by their actuating mechanism, whereby the barrel or keg is fully compressed and molded to its final density and shape.

If desired, the preliminary molding of the barrel or keg body in a separate molding apparatus may be dispensed with, and the molding of the barrel or keg body may be effected directly in the press. In this case the presser-staves are expanded, and the sections of the former of the press are likewise expanded into engagement with the chime-forming rings G G', thereby forming an annular space between the former and the surrounding presser-staves. The space is then filled with the composition, closed by the retaining-ring N, and heated by the core H. The presser-staves are also heated by any suitable means—for instance, gas-jets or steam-jackets—to aid in heating the composition to a plastic state. The presser-staves are then moved inwardly, and the composition is compressed to form the barrel or keg body around the former. Although the entire operation of molding and pressing such a body may be effected in the press, it is preferred to mold the barrel-body in a separate molding apparatus of the character described, because the molding operation can in this manner be effected more expeditiously, and, furthermore, the molding of bodies can be carried on while the press is being used for pressing previously-molded bodies, thereby expediting the manufacture.

By means of the forming-rings G G' applied to the ends of the former-sections preferably smooth chimes are formed at the ends of the pressed body. This permits of fitting and securing the heads of the barrels or kegs snugly in these chimes. If the former were not provided with these chime-forming rings, a bur or fin would be formed at the joint between adjacent former-sections, which bur or fin would have to be removed before a perfect fit of the head into the chimes could be obtained.

By allowing the chime-forming rings to remain on the ends of the molded body these rings serve as a frame or holder which retains the body in its molded shape and prevents the same from collapsing or getting out of shape while being transferred from the molding apparatus to the press.

I claim as my invention—

1. The combination with a collapsible former having two pairs of folding sections and two sliding sections arranged between the two pairs of folding sections, of a hand-lever and connecting mechanism whereby the sliding sections are actuated, and an independent hand-lever and connecting mechanism whereby the folding sections are actuated, substantially as set forth.

2. The combination with a collapsible former having two pairs of folding sections and two sliding sections arranged between the two pairs of folding sections, of rock-levers connected with said sliding sections, separate rock-levers connected with said folding sections, separate actuating hand-levers for said sliding sections and for said folding sections, and links connecting said hand-levers, respectively, with the rock-levers of said sliding and folding sections, substantially as set forth.

3. The combination with the sliding former-sections provided with downwardly-projecting actuating-pins or guide-pins, of a slotted guide-plate provided with radial slots arranged in line with each other for the reception of said actuating-pins and with parallel guide-slots for the reception of said guide-pins, and actuating mechanism connected with said actuating-pins below said guide-plate, substantially as set forth.

4. The combination with the upper press-plate provided with a central opening for the introduction of the core and the article to be pressed, the lower press-plate, the presser-staves arranged between said plates, the collapsible former, and the core arranged with its upper portion within said opening, of a retaining-ring detachably arranged within said opening of the top plate and surrounding said core, substantially as set forth.

5. The combination with the upper press-plate provided with a central opening for the introduction of the core and the article to be pressed, the lower press-plate, the presser-staves arranged between said plates, the collapsible former and the core, of a retaining-ring adapted to seat itself in said opening above said presser-staves, said ring being hinged on one side to said upper press-plate and secured to said plate on the opposite side by a detachable fastening, substantially as set forth.

Witness my hand this 23d day of May, 1900.

GEORGE W. LARAWAY.

Witnesses:
  EUGENE L. ASHLEY,
  EDWARD WILHELM.